Figure 1:
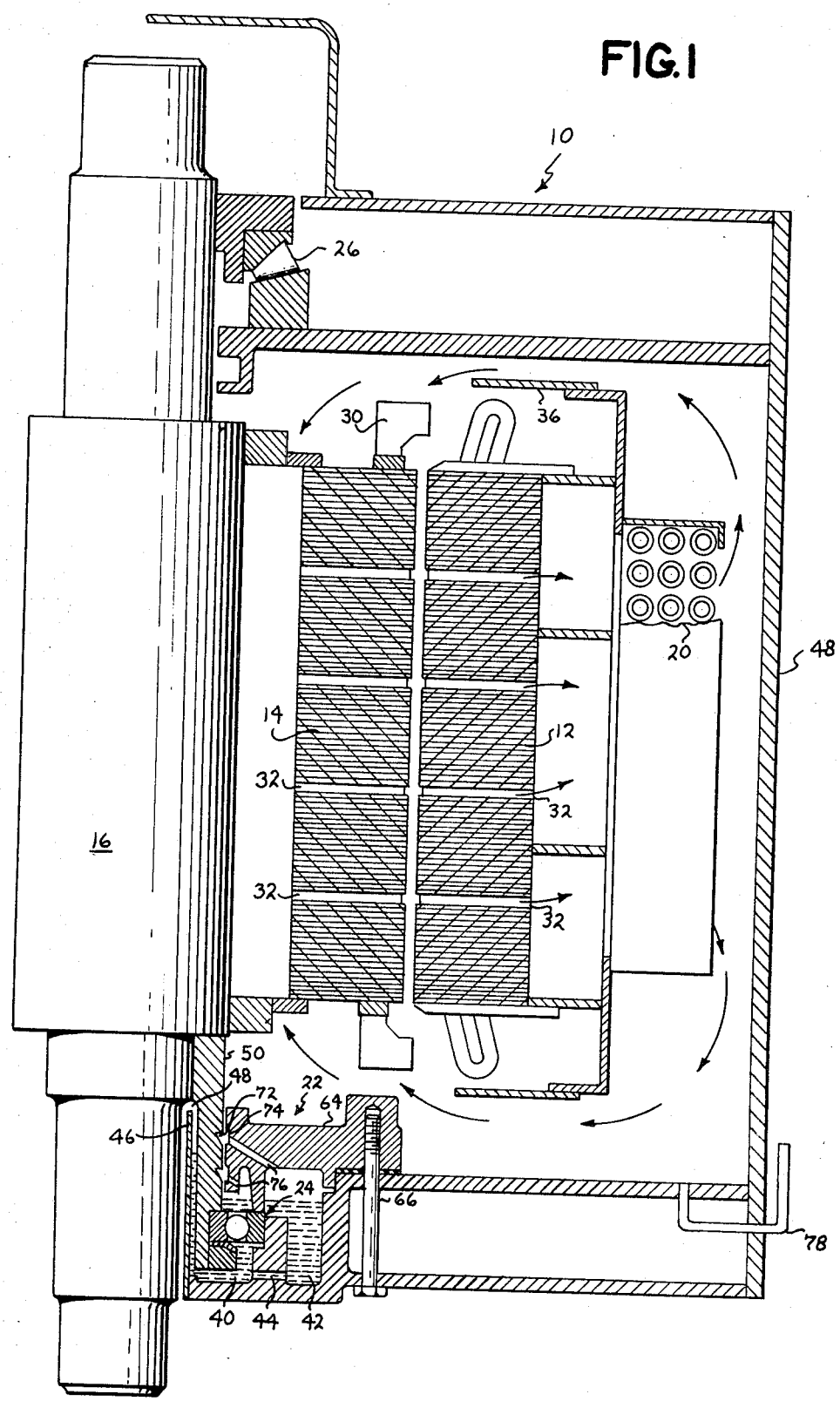

United States Patent [19]
Gleichman

[11] 3,751,699
[45] Aug. 7, 1973

[54] GAS FILLED VERTICAL DYNAMOELECTRIC MACHINE

[75] Inventor: Robert F. Gleichman, San Jose, Calif.

[73] Assignee: General Electric Company, Schenectady, N.Y.

[22] Filed: Apr. 25, 1972

[21] Appl. No.: 247,369

[52] U.S. Cl.................. 310/90, 310/58, 310/157, 184/6
[51] Int. Cl. ............................................ H02k 5/16
[58] Field of Search.................... 310/157, 91, 58, 310/55, 61, 90; 308/134.1; 184/6

[56] References Cited
UNITED STATES PATENTS

| | | | |
|---|---|---|---|
| 3,158,768 | 11/1964 | Schonwald | 310/157 |
| 3,083,312 | 3/1963 | Moore | 310/157 |
| 2,610,992 | 9/1952 | Johns | 310/61 |
| 2,635,198 | 4/1953 | Wieseman | 310/157 |

FOREIGN PATENTS OR APPLICATIONS

| 751,421 | 9/1933 | France | 310/157 |
|---|---|---|---|

Primary Examiner—R. Skudy
Attorney—Vale P. Myles et al.

[57] ABSTRACT

A totally enclosed, inert gas filled vertical dynamoelectric machine is described wherein liquid lubricant in the lower bearing housing is employed to seal the machine output shaft against the loss of inert gas. To inhibit loss of lubricant from the seal, a stationary oil sleeve concentrically disposed within a zone between the rotor shaft and shaft sleeve protrudes to a height in excess of the oil level within the housing by an amount at least equal to the change in level produced by the pressure of the inert gas within the machine. The lower bearing preferably is enclosed by a selectively notched bearing cover which serves in conjunction with annular grooves upon the shaft sleeve to prevent oil creepage along the exterior of the shaft while blow-out of oil from the seal by excessive gas pressure within the machine is inhibited by a liquid filled, generally U-shaped tube communicating the motor interior with the ambient. To prevent turbulence produced by rotation of the rotor from breaking the seal, the lubricant should extend to a level above the bearing or a selectively apertured partition could be inserted between the lower end of the shaft sleeve and the bearing.

12 Claims, 4 Drawing Figures

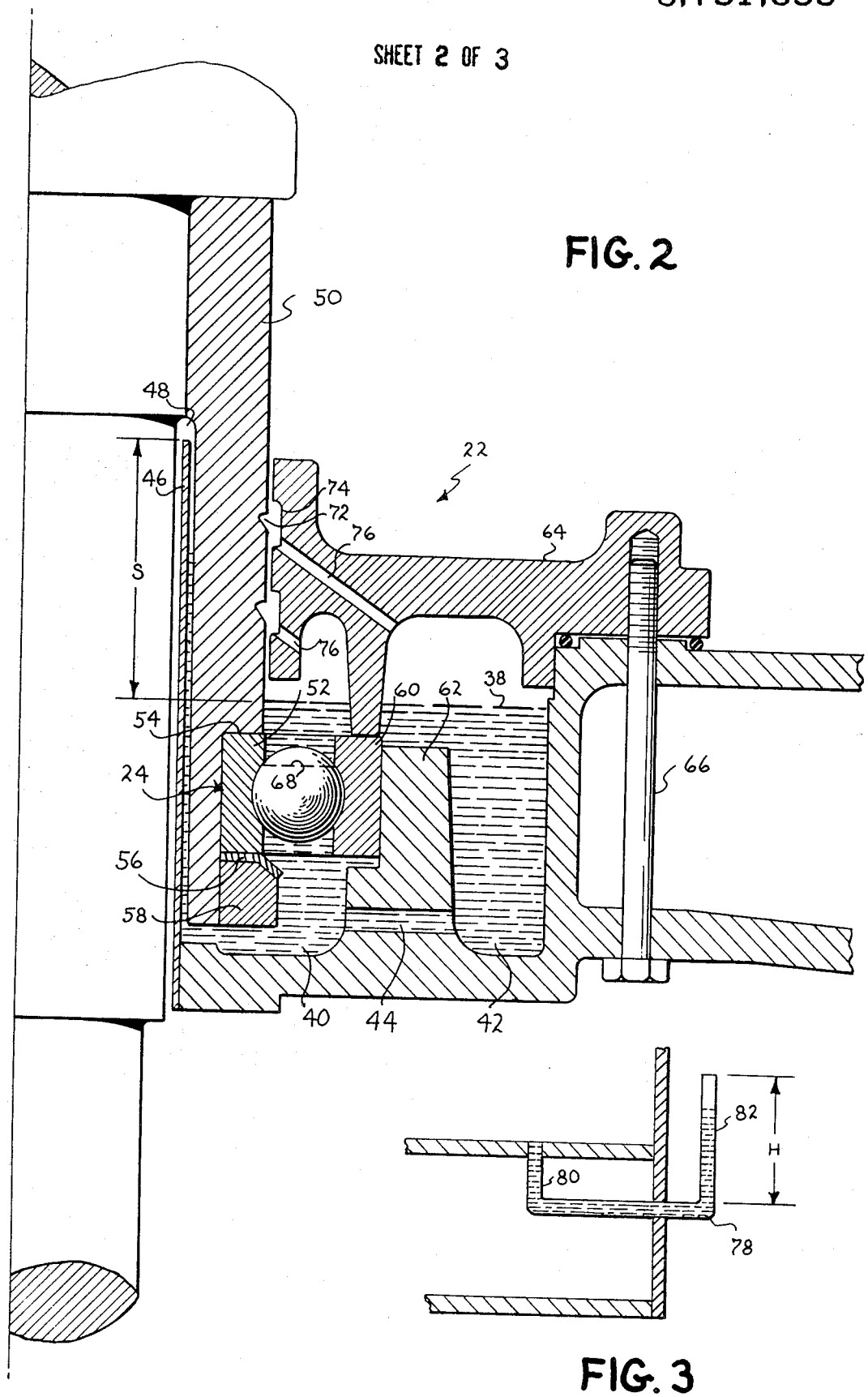

3,751,699

GAS FILLED VERTICAL DYNAMOELECTRIC MACHINE

This invention relates to inert gas filled vertical dynamoelectric machines and, in particular, to a vertical dynamoelectric machine having a novel lower seal to inhibit loss of pressurized inert gas from the machine.

When a dynamoelectric machine is to be operated in a potentially explosive environment, e.g., a sewage treatment plant wherein gases such as hydrogen may be generated, the machine often is charged with an inert gas to prevent leakage of the explosive atmosphere into the machine. Because the machine shaft normally must be brought through the machine housing for coupling to the driven equipment, complete enclosure of the housing is difficult to achieve and the end shields for inert gas filled dynamoelectric machines in explosive environments typically are designed to permit controlled leakage of the inert gas from the machine at the seal.

Among the seals typically utilized to contain pressurized inert gas within a horizontal motor are forced lubrication bearing and shaft seals wherein sealing oil is fed through dual entrances into an axially partitioned split sleeve bearing with the oil from the bearing seal being fed to a compartmentalized gas separating chamber wherein gas bubbles within the oil are removed prior to recirculation of the oil through the seal. Proposals also have been made that labyrinth type seals of various design be utilized to allow controlled leakage of gas from the motor or that contacting face seals (e.g., of a design such as is shown in McHugh U.S. Pat. No. 3,704,019, issued Nov. 28, 1972, which is assigned to the assignee of the present invention) be utilized for such purpose.

I have discovered, however, that the liquid lubricant for the shaft bearing can be employed to seal a vertical machine by utilizing an elongated lubricant sleeve between the rotor shaft and shaft sleeve to accommodate the excessive lubricant elevation produced by the pressure of the inert gas upon the lubricant. While arrangements of this general nature heretofore have been utilized with non-pressurized vertical motors to retain the lubricant (e.g., a structure of somewhat similar design is described in Tillma patent application, Ser. No. 73,767, filed Sept. 21, 1970, to retain bearing lubricant in a non-pressurized vertical motor), the lubricant sleeves of these prior art arrangements extend only slightly above, e.g., approximately one to two inches above, the level in the lower bearing lubricant reservoir dependent upon such factors as the size of the motor and the amount of agitation produced by rotation of the shaft sleeve. The oil sleeve of the present invention, however, extends above the oil level in the bearing reservoir by an additional amount at least equal to the change in level produced by the inert gas pressure in the machine to seal the machine and to inhibit leakage of oil at the shaft.

Should the pressure of the inert gas within the machine increase beyond a limited range during operation, oil within the lower bearing could be expelled from the machine leading to bearing failure. I also have discovered that a liquid filled trap can serve within the machine as a pressure release valve to limit excessive pressures before lubricant is exhausted from the seal.

It is therefore an object of this invention to provide a novel inert gas filled vertical motor having a superior seal.

It is also an object of this invention to provide a gas filled vertical motor having a novel pressure release valve to inhibit exhaust of lubricant from the lower seal.

These and other objects of this invention generally are achieved by the disposition of an elongated lubricant sleeve between the rotor shaft and the shaft sleeve to accommodate the excessive lubricant levels produced by the pressurized inert gas upon the seal. Thus, a dynamoelectric machine in accordance with this invention typically would include a conventional rotor and stator along with suitable means, such as rotor mounted fans, for circulating a pressurized gas through the machine to remove heat therefrom by forced convection and conduction to a cooler surface. Lubricant within the lower bearing of the machine is employed to inhibit leakage of pressurized gas from the machine, and the shaft seal is characterized by a rotary sleeve circumferentially disposed about the lower end of the shaft with a lubricant sleeve extending concentrically into the zone between the shaft and shaft sleeve to confine liquid lubricant for the lower bearing within the machine. In accordance with the teachings of this invention, the lubricant sleeve extends to a height above the liquid lubricant level within the bearing by an amount at least equal to the change in level produced by the pressure of the inert gas within the machine to inhibit spillage of the lubricant over the oil sleeve. Means also are provided, such as an anormally high level of lubricant within the bearing or a selectively apertured partition beneath the bearing, to prevent agitation produced by rotation of the bearing from breaching the gas seal.

Figure 4:
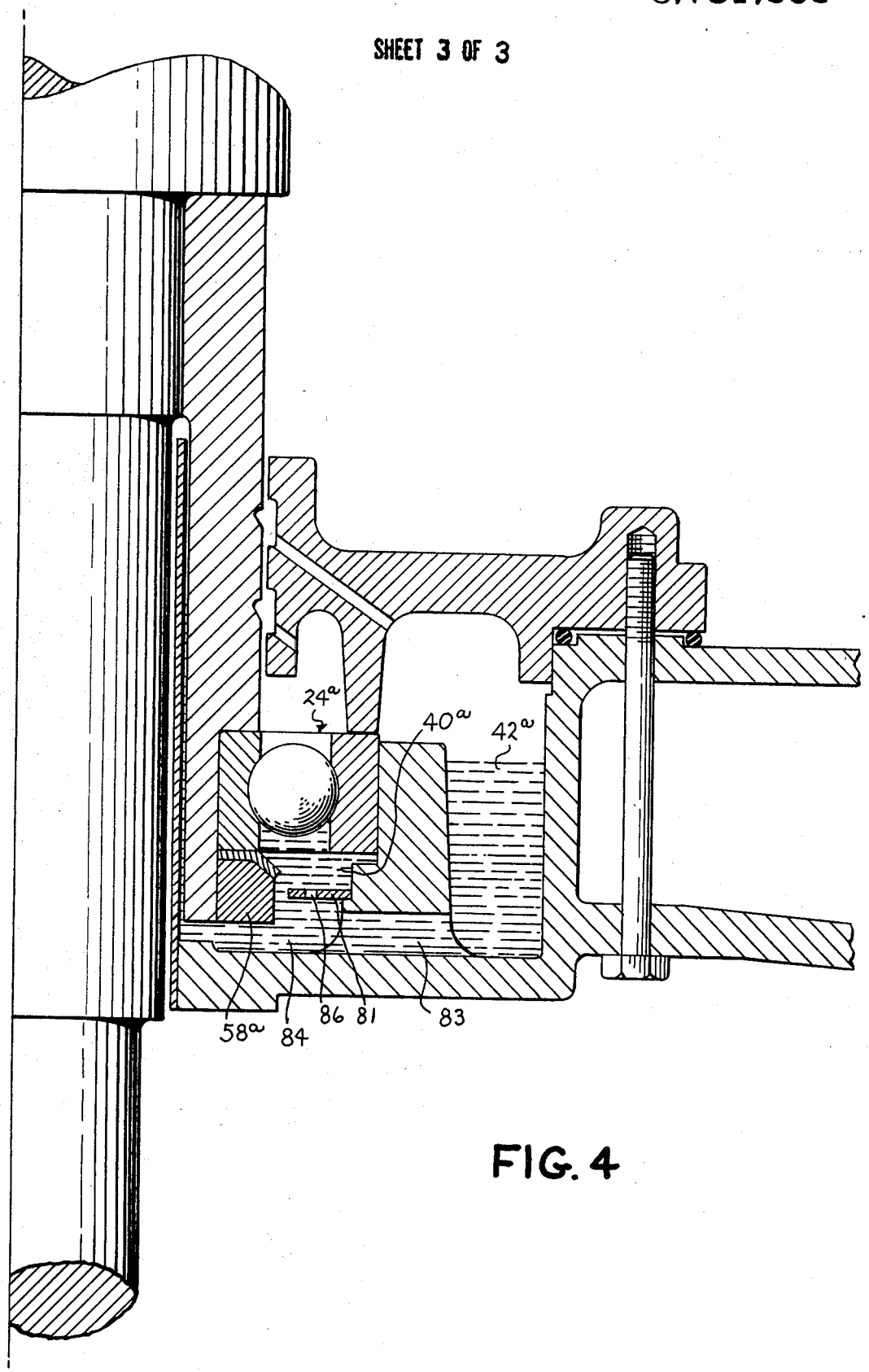

Although this invention is described with particularity in the appended claims, a more complete understanding of the invention may be obtained from the following detailed description of a specific embodiment of the invention when taken in accordance with the appended drawings wherein:

FIG. 1 is a sectional view of a vertical motor having a lower shaft seal in accordance with this invention, FIG. 2 is an enlarged sectional view of the lower shaft seal of the motor illustrated in FIG. 1, FIG. 3 is an enlarged view of a pressure release valve employed in the gas filled motor to inhibit loss of lubricant from the lower bearing housing, and FIG. 4 is an alternate seal configuration in accordance with this invention permitting conventional levels of lubricant in the lower bearing.

An inert gas filled vertical motor 10 in accordance with this invention is illustrated in FIG. 1 and generally includes a stator 12 circumferentially disposed about a rotor 14 mounted upon vertically extending shaft 16. The motor is enclosed within a sealed housing 18 with heat generated by current flow through the motor being removed by circulating a pressurized inert gas, such as nitrogen, between the coils of heat exchange unit 20 mounted along one side of the motor within housing 18. The drive end of shaft 16 extends from the lower end of the housing to be connected to a load (not shown) and loss of inert gas from the motor in accordance with this invention is inhibited by a lower bearing seal 22.

Other than the lower bearing seal (and other features relative to the seal protection to be more fully explained hereinafter), motor 10 generally is conventional in design with the lower end of shaft 16 being rotatably mounted within a guide bearing 24 while a spherical roller thrust bearing 26 at the upper end of the shaft serves both as a guide bearing and as a thrust bearing to permit rotation of shaft 16 while supporting the weight of the rotor and the externally applied axial thrust load within the structure. Bearings to accomplish the foregoing purposes are well-known in the art with thrust and guide bearings suitable for this invention being disclosed in the aforementioned Tillma patent application. It will be appreciated, however, that this invention also is applicable to machines having other type bearings, e.g., the machine could have combinations of ball thrust bearings, plate-type thrust bearings, ball lower guide bearings and sleeve type upper and lower guide bearings. If desired, an anti-reverse device (not shown) of known configuration also could be mounted upon the shaft to prevent reverse rotation of the rotor.

Cooling of motor 10 in accordance with this invention is accomplished by circulating the pressurized inert gas through the motor housing by fans 30 mounted at opposite ends of rotor 14. As is illustrated by the arrows depicting gas flow within the machine, gas passes axially inward from both ends of the rotor to aligned radial passages 32 in the rotor and stator to absorb heat therefrom before flowing between the coils of heat exchange unit 20 wherein a fluid, typically water, is circulated to cool the pressurized inert gas by forced convection and conduction. The cooled gas then is divided in axially opposite streams by motor housing 18 and suitable baffles 36 direct the streams to the fans at opposite ends of the rotor for recirculation through the machine. To inhibit entry of an explosive gas into the motor, the inert gas within motor 10 typically is pressurized to a pressure of approximately 2 inches water, i.e., 0.147 inches $H_g$, to assure an outflow of inert gas through any minute opening in the housing.

In accordance with this invention, the lower end of shaft 16 is sealed utilizing the lubricant, typically oil 38, within lower guide bearing 24 as is illustrated in FIG. 2. The oil for the guide bearing preferably is retained within a first annular oil channel 40 of limited capacity in communication with guide bearing 24 while a large capacity, externally fed, oil storage reservoir 42 is communicated to oil channel 40 through a selectively dimensioned aperture 44 to supply limited quantities of fresh oil to the bearing as needed. An elongated oil sleeve 46 extending concentrically into the annular zone 48 formed between shaft 16 and shaft sleeve 50 serves to confine the oil within the lower guide bearing. In accordance with this invention, the oil sleeve extends to a height substantially greater than prior art oil sleeves of similar design, i.e., oil sleeve 46 extends to a height greater than the height of the lubricant in bearing 24 by an amount at least equal to the additional oil level height produced by the inert gas pressure within the motor. Thus, when the height of the oil within the bearing is approximately X inches and the pressure of the inert gas within the motor is Y inches of water, oil sleeve 46 should extend to a height in excess of $$X + Y (D2/D1)$$

wherein D1 and D2 are the densities of the oil within the lower bearing and water, respectively. In general, oil sleeve 46 should extend at least three inches beyond the height of the oil within oil channel 40 (as opposed to protrusions of approximately 1 to 2 inches for prior art vertical motor seals utilized in non-pressurized motors). A rapid appraisal of the desired height of oil sleeve 46 for a given pressurized motor may be obtained by adding the oil level sustained by the gas pressure in the motor (plus a given percentage, e.g., 50% of the substained oil level as a safety factor) to the conventional height of the oil sleeve for a non-pressurized motor of comparable design.

As is shown more clearly in FIG. 2, radially inner ring 52 of guide bearing 24 is fixedly secured between a shoulder 54 in shaft sleeve 50 and lockwasher 56 upon tightening of ball bearing nut 58 while radially outer ring 60 of the guide bearing is juxtaposed with an annualr protrusion 62 in the motor end shield. The lower bearing seal is enclosed by annular bearing cover 64 secured in fixed position by cap screws 66 to confine oil thrown by the guide bearing during operation. To inhibit flow of oil along the outer periphery of shaft sleeve 50, a plurality of annular notches 72 are provided along the exterior surface of the sleeve to coagulate the upwardly traveling oil film into droplets whereafter centrifugal force throws the droplets into grooves 74 in bearing cover 64. The lubricant then flows down through exit channels 76 in the bearing cover to return to oil channel 40 or oil storage reservoir 42.

The height of the oil level within the guide bearing has been found to be highly important for the proper operation of this invention. For a seal of the design illustrated in FIGS. 1 and 2 with conventionally utilized lubricant levels, i.e., with the oil extending only to the height of the upper edges of the raceways in guide bearing 24 (shown by dotted line 68), a leakage rate of approximately 14 cubic feet per hour was observed in a 440 rpm motor notwithstanding an inert gas leakage rate of only 1 cubic foot per hour during non-operating periods. The excessive leakage rate of the inert gas during operation is postulated as being caused by breach of the seal resulting from turbulence in the oil in the region 40 below the bearing produced by rotation of the ball bearing. When the oil level within bearing seal 22 was raised by one inch to a total height of approximately 2½ inches, i.e., a level approximately 66 percent higher than conventionally utilized oil levels for guide bearings, the leakage rate of inert gas through the seal during operation was reduced to below approximately 4 cubic feet per hour.

Because an excessive build-up of inert gas pressure within the motor during operation can drive the oil from lower bearing seal 22 over oil sleeve 46 leading to destruction of the bearing, a pressure release valve should be provided within the motor. A particularly preferred pressure release valve in accordance with this invention is illustrated in FIG. 3 and generally consists of a generally U-shaped tube 78 which is filled with a liquid, such as draft gage fluid 80 (i.e., a commercially available oil having a density equal to the density of water), to block escape of inert gas from the motor. The tube, however, preferably is dimensioned so that all the draft gage fluid will be exhausted from the U-shaped tube by an increase in gas pressure within the motor housing before oil from the lower bearing seal is forced over oil sleeve 46. To accomplish this, the height H of overflow side 82 of U-shaped tube 78 should be less than $S \cdot D1/D3$ wherein S is the span (shown in FIG. 2) between the top of oil sleeve 46 and the operating oil level within reservoir 42, D1 is the density of the oil in lower bearing seal 22 and D3 is the density of the draft gage fluid. Because excessive leakage of water from heat exchange unit 20 also can lead to destruction of the motor unless such leakage is alleviated, U-shaped tube 78 desirably extends through the motor housing at a location below the heat exchange unit either at the lowest point in the motor or a suitable liquid collecting means, such as sheet metal ducting (not shown), is provided within the motor to channel any water from the heat exchange unit into U-shaped tube 78. Any excessive leakage from the heat exchange unit then overflows from the U-shaped tube to a collection basin for disposal.

An alternate seal arrangement permitting conventional levels of lubricant within the lower bearing seal is illustrated in FIG. 4. This seal is similar to that illustrated in FIG. 2 except an annular plate 81 is disposed between the axially lower end of ball bearing nut 58a and the surface of the oil within oil channel 40a to inhibit oil turbulence produced by the ball bearing during rotor rotation from breaking the seal. A substantially enlarged aperture 83, or a plurality of apertures (not shown), then is utilized to communicate oil storage reservoir 42a with bearing oil channel 40a to continuously maintain a full head of oil in lower region 84 of oil channel 40a adjacent the end of the locknut while oil flow to bearing 24a is regulated by selectively dimensioned apertures 86 in the plate 81. By partitioning the bearing from the end of the shaft, conventional oil levels can be utilized in the machine.

What I claim as new and desire to secure by Letters Patent of the United States is:

1. In a dynamoelectric machine characterized by a rotor mounted upon a vertically extending shaft, a stator circumferentially mounted around said rotor, and means for circulating a pressurized fluid through at least a portion of said machine to remove heat by forced convection and conduction from said pressurized fluid to a cooler surface lying within the flow path of said fluid, the improvement comprising a shaft seal situated between said pressurized fluid and the machine ambient to inhibit excessive leakage of pressurized fluid from said machine, said seal including a reservoir of liquid lubricant, a bearing disposed circumferentially about said shaft to permit rotation of said rotor within said stator, at least a portion of said bearing being submerged within said liquid lubricant, a rotary sleeve fixedly secured to said shaft to rotate therewith, an axial portion of said sleeve being spaced from said shaft to provide an annular zone between said shaft and said sleeve, a lubricant sleeve extending into the zone between said rotary sleeve and said rotary shaft, the radially outer face of said lubricant sleeve serving to confine liquid lubricant within said machine, said lubricant sleeve extending axially to a height in excess of the depth of lubricant within said reservoir by an amount at least equal to the difference in lubricant levels respectively in said annular zone and in said reservoir that are produced by the pressure of said fluid within said machine, thereby to permit the lubricant level within the region between the lubricant sleeve and the rotary sleeve to substantially exceed the height of lubricant within said reservoir without spilling over said lubricant sleeve, said lubricant within said bearing seal contacting both said machine ambient and said pressurized fluid to seal the interior of said machine.

2. A dynamoelectric machine according to claim 1 further including means for inhibiting turbulence produced by rotor rotation from penetrating the region at the lower end of said shaft sleeve to breach said seal during operation of said machine.

3. A dynamoelectric machine according to claim 2 wherein said turbulence inhibiting means includes a level of lubricant within said bearing seal in excess of the height of said bearing to completely submerge said bearing within said lubricant reservoir.

4. A dynamoelectric machine according to claim 3 further including at least one annular groove notched along the radially outer surface of said shaft sleeve, a bearing cover circumferentially disposed about said rotary sleeve at an axial location above said bearing seal, said bearing cover having a notch in registration with the groove of said shaft sleeve and means for gravitationally returning lubricant from said notch to said liquid lubricant reservoir.

5. A dynamoelectric machine according to claim 2 wherein said turbulence inhibiting means includes a selectively apertured annular plate disposed between the lower end of said rotary sleeve and said bearing.

6. A dynamoelectric machine according to claim 1 further including a curved tube extending through the housing of said machine, said tube containing liquid in communication with both the pressurized fluid within said machine and the external environment of said machine, said tube being dimensioned to be completely exhausted by an increase in the pressure of said pressurized fluid before lubricant is driven over said oil sleeve within said machine.

7. A vertical dynamoelectric machine comprising a stator, a rotor secured upon a vertically extending shaft, bearing means mounted at spaced apart locations along said rotor to permit rotation of said rotor within said stator, a housing enclosing said machine, a pressurized heat transfer fluid circulating within said housing to transfer heat absorbed from said rotor and stator to a relatively cooler surface along the interior of said machine, a lower bearing seal situated between said pressurized fluid and the motor environment to inhibit leakage of said pressurized fluid from said machine, said seal including a reservoir of liquid lubricant extending to a height at least partially submerging the lower one of said bearing means, a rotary sleeve fixedly secured to said shaft at an axially upper portion of said sleeve, said sleeve being spaced from said shaft along the axially lower portion of said sleeve to provide an annular zone therebetween, a lubricant sleeve extending into the annular zone between said shaft sleeve and said shaft, the radially outer face of said lubricant sleeve serving as a retaining wall for said liquid lubricant, said lubricant sleeve extending to a height at least 3 inches higher than the level of liquid lubricant within said lower bearing means to inhibit spillage of said lubricant over said lubricant sleeve, said lubricant within said bearing seal contacting both said machine ambient and said pressurized fluid.

8. A vertical dynamoelectric machine according to claim 7 wherein said pressurized fluid is cooled by heat exchange with liquid pumped through coils within said machine, said machine further including a curved tube extending through the housing of said machine, said curved tube containing a liquid in communication with both said pressurized fluid and the outside environment, said tube being dimensioned to be completely exhausted by an increase in pressure in said machine before lubricant is driven over said lubricant sleeve.

9. A dynamoelectric machine according to claim 8 wherein said U-shaped tube is situated at a location to receive leakage from said coils, said tube serving to exhaust liquid in excess of a predetermined amount.

10. A dynamoelectric machine according to claim 7 further including means for inhibiting turbulence produced by rotor rotation from penetrating the region at the lower end of said shaft sleeve to breach said seal during operation of said machine.

11. A dynamoelectric machine as defined in claim 7 wherein said lower bearing is completely submerged in said liquid lubricant.

12. An invention as defined in claim 11 wherein said liquid lubricant extends to a height at least 1 inch above the upper edges of said lower bearings.

* * * * *